(12) United States Patent
Dudar

(10) Patent No.: US 10,679,437 B1
(45) Date of Patent: Jun. 9, 2020

(54) ACTIVE AIR DAM DIAGNOSTIC METHOD

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/196,595

(22) Filed: Nov. 20, 2018

(51) Int. Cl.
| | |
|---|---|
| *B60Q 1/00* | (2006.01) |
| *G07C 5/08* | (2006.01) |
| *B62D 35/00* | (2006.01) |
| *G01M 17/00* | (2006.01) |
| *B62D 37/02* | (2006.01) |

(52) U.S. Cl.
CPC ......... *G07C 5/0808* (2013.01); *B62D 35/005* (2013.01); *B62D 37/02* (2013.01); *G01M 17/00* (2013.01); *G07C 5/0825* (2013.01)

(58) Field of Classification Search
CPC .. G07C 5/0808; G07C 5/0825; B62D 35/005; B62D 37/02; G01M 17/00
USPC ........................................................ 340/438
See application file for complete search history.

(56) References Cited

U.S. PATENT DOCUMENTS

| | | | |
|---|---|---|---|
| 7,429,074 B2 | 9/2008 | Mc Knight et al. | |
| 9,849,924 B2 * | 12/2017 | Shami | B62D 35/005 |
| 9,937,966 B1 * | 4/2018 | Yoon | B62D 25/182 |
| 9,950,751 B2 | 4/2018 | Heil et al. | |
| 10,081,400 B2 * | 9/2018 | Abdoul Azizou | H02P 6/16 |
| 10,183,573 B1 * | 1/2019 | Klop | B60K 11/08 |
| 2012/0001450 A1 * | 1/2012 | Li | B62D 35/007 296/180.1 |
| 2013/0093210 A1 * | 4/2013 | Johnson | B62D 35/005 296/181.5 |
| 2013/0338870 A1 * | 12/2013 | Farmer | B60K 11/085 701/29.2 |
| 2014/0142819 A1 * | 5/2014 | Pursifull | F01P 11/16 701/51 |
| 2016/0229405 A1 * | 8/2016 | Shimizu | B60W 30/182 |
| 2016/0252381 A1 * | 9/2016 | Kwak | G01F 9/00 701/123 |
| 2016/0291806 A1 * | 10/2016 | Civiero | B60K 35/00 |
| 2016/0339972 A1 * | 11/2016 | Beckon | B62D 37/02 |
| 2017/0001639 A1 * | 1/2017 | Dempsey | B60W 50/085 |
| 2017/0036709 A1 | 2/2017 | Metka et al. | |
| 2017/0057567 A1 * | 3/2017 | Aoki | B62D 37/02 |
| 2017/0092022 A1 * | 3/2017 | Heil | B62D 35/005 |
| 2017/0101136 A1 * | 4/2017 | Zielinski | B62D 35/005 |
| 2017/0106922 A1 * | 4/2017 | Povinelli | B62D 35/02 |

(Continued)

OTHER PUBLICATIONS

Laforest, A., "Magna active air dams boost aerodynamics on Ram 1500," Plastic News Website, Available Online at http://www.plasticsnews.com/article/20180201/NEWS/180209982/magna-active-air-dams-boost-aerodynamics-on-ram-1500, Feb. 1, 2018, 2 pages.

*Primary Examiner* — Zhen Y Wu

(74) *Attorney, Agent, or Firm* — Geoffrey Brumbaugh; McCoy Russell LLP

(57) ABSTRACT

Methods and systems are provided for diagnosing a vehicle having an air dam for improving vehicle aerodynamics. In one example, during steady-state vehicle cruising, a baseline fuel economy for the vehicle is established with the air dam deployed. Then, the air dam is actively retracted and air dam hardware issues are identified based on a change in fuel economy following the commanded change in air dam position.

19 Claims, 7 Drawing Sheets

(56) References Cited

U.S. PATENT DOCUMENTS

| | | | |
|---|---|---|---|
| 2017/0120743 A1* | 5/2017 | Dudar | B60K 11/085 |
| 2017/0120968 A1* | 5/2017 | Povinelli | B62D 37/02 |
| 2017/0129448 A1* | 5/2017 | Farooq | B60R 19/023 |
| 2018/0215424 A1* | 8/2018 | Marmo | B62D 35/02 |
| 2018/0339733 A1* | 11/2018 | Frederick | B62D 35/00 |
| 2019/0009831 A1* | 1/2019 | Albertson | B62D 35/008 |
| 2019/0084629 A1* | 3/2019 | Prince | B62D 35/007 |
| 2019/0092403 A1* | 3/2019 | Bray | B62D 37/02 |
| 2019/0152543 A1* | 5/2019 | Shiga | B62D 37/02 |
| 2019/0202504 A1* | 7/2019 | Mandl | B62D 35/02 |

* cited by examiner

AAD Retracted

AAD Deployed

ACTIVE AIR DAM DIAGNOSTIC METHOD

FIELD

The present description relates generally to a vehicle having an active air dam system for reducing aerodynamic drag underneath the vehicle and more particularly to a method for diagnosing hardware related to the active air dam system.

BACKGROUND/SUMMARY

Aerodynamic airflow is a significant consideration during vehicle body design. Effective airflow management over a vehicle body can assist in meeting functional demands for passenger compartment acoustics, fuel efficiency, and safety of passenger type vehicles. Aerodynamic designs can also enhance vehicles control and improve speed of passenger vehicles. To reduce aerodynamic drag experienced at a vehicle at mid-high vehicle speeds, and to reduce the associated drop in fuel economy, vehicles may be configured with air deflectors or "active air dams". These aerodynamic features are actuated between deployed and retracted (or stowed) positions and are used to deflect airflow around a vehicle frame, thereby limiting front end lift, and creating down-force. For example, when deployed, active (front) air dams (AAD) limit motor vehicle front end lift by creating a down-force, forcing the vehicle nose down, and thereby improving vehicle handling and stability. Front air dams may also assist in engine cooling. Other air deflectors, such as spoilers, can provide a similar effect, for example by creating a down force near a vehicle rear end to improve rear wheel contact with a road surface.

Over time and varying vehicle operating conditions, the mechanisms that deploy and stow the active air dams (e.g., linkages) may degrade. This can leave the air dam stuck in a deployed position when commanded to retract, or leave the air dam stowed when commanded to deploy. In this situation, aerodynamic drag may be increased, and fuel economy may be adversely impacted. Therefore, it may be desirable to determine whether or not the hardware associated with active air dams are operating as desired.

Various approaches have been identified for diagnosing degradation in AAD systems. One example approach is shown by Shami in U.S. Pat. No. 9,849,924. Therein, the engine control system relies on feedback from a plurality of speed and position sensors to infer AAD functionality. Still other approaches may rely on position feedback sensors coupled to the active air dams. Feedback from position sensors may be used to confirm if the air dam has deployed when actuated to deploy, and retracted when actuated to retract. For example, in U.S. Pat. No. 10,081,400, Azizou et al. rely on one or more of a position, a drawn current draw, and a back-electromotive force (back-EMF) of an AAD actuator to perform on-board diagnostics. In still further examples, Hall effect sensors may be used.

However, the inventors herein have recognized potential issues with such systems. As one example, there may be multiple modes associated with degraded AAD functionality that are not detectable via the above-mentioned sensors. For example, if Hall effect sensors are damaged or become contaminated from the environment, a AAD position may be unavailable, and the diagnostic may not be reliable. As yet another example, the AAD (e.g., the shutter, the linkage, or the sensor) may freeze due to ice accumulation. In such a situation, it may be difficult to distinguish between a degraded sensor and a degraded AAD shutter. As still another example, the AAD shutter may be stuck (in a retracted or deployed position) while the sensors are still functional. Alternatively, the AAD shutter may be functional while the sensors are degraded. In either case, the sensor signal may be unreliable for diagnostics. Consequently, an alternate method that supplements the sensor-based approach may be required to confirm AAD functionality reliably.

In one example, the issues described above may be at least partly addressed by a method including, during steady-state vehicle cruising, commanding a transition of an aerodynamic mechanism, coupled to a body of the vehicle, between a more deployed and a more retracted position; and indicating degradation of the mechanism responsive to fuel usage change of an engine of the vehicle following the commanding. The fuel usage change may be assessed in relation to a baseline established while operating the engine with an active air dam system of the vehicle in the deployed position. In one example, the more deployed position is a fully deployed position and the more retracted position is a fully retracted position of the air dam. In this way, a reliable diagnosis of AAD functioning may be made and degradation of the AAD hardware may be identified.

As an example, a vehicle may be propelled at a steady mid-to-high speed level with the engine in steady-state operation (e.g., during highway cruising). In particular, the vehicle may be at a speed level where the AAD system is fully deployed. A controller of the vehicle may calculate a resulting first fuel economy during the AAD-deployed mode. If the AAD mechanisms are not degraded, the first fuel economy calculated during the AAD deployed mode may be similar to or equal to a baseline fuel economy. The baseline fuel economy may be determined when the AAD mechanism is intact and functional, such as following manufacture of the vehicle. Then, while still in the steady-state operation, the AAD system may be transitioned to a fully retracted position. A second fuel economy may be calculated while operating in the AAD-retracted mode. The switch in AAD operation may result in an expected change (e.g., a decrease) in the second fuel economy of the vehicle from both the baseline fuel economy and the first fuel economy calculated, if the AAD mechanism is not degraded. However, if the calculated second fuel economy remains unchanged (e.g., does not decrease), despite the commanded change, the AAD mechanism may be determined as degraded. Further, if the determined second fuel economy is found to be within a threshold of the baseline fuel economy, the VDE may be confirmed as stuck in the AAD-deployed mode. Likewise, if the determined first fuel economy is found to be outside a threshold of the baseline fuel economy, the VDE may be confirmed as stuck in the AAD-retracted mode In this way, an AAD system can be independently diagnosed without the need for additional sensors. By comparing the fuel economy of an engine with the AAD hardware deployed or retracted with a baseline fuel economy established while the AAD system is confirmed to be functional, the impact of AAD adjustments on fuel economy can be leveraged for diagnosing the AAD system. By correlating the results of a fuel economy based diagnostic test with sensor data, lack of AAD functionality due to AAD hardware degradation can be better distinguished from sensor degradation. By allowing an AAD system to be timely and reliably diagnosed, the fuel economy benefits of the system can be extended over a longer duration of vehicle operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
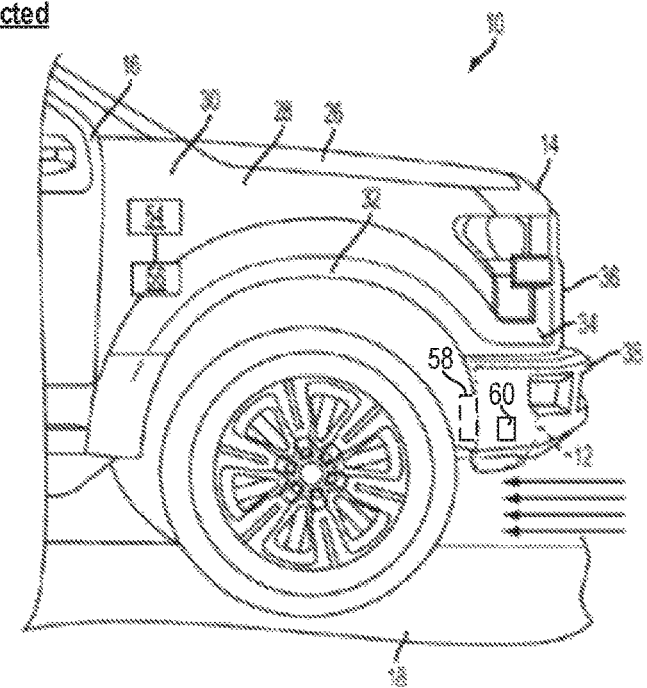
FIGS. 1A and 1B show a vehicle system configured with an active air dam (AAD) system for reducing aerodynamic drag in retracted and deployed positions, respectively.
Figure 1B:
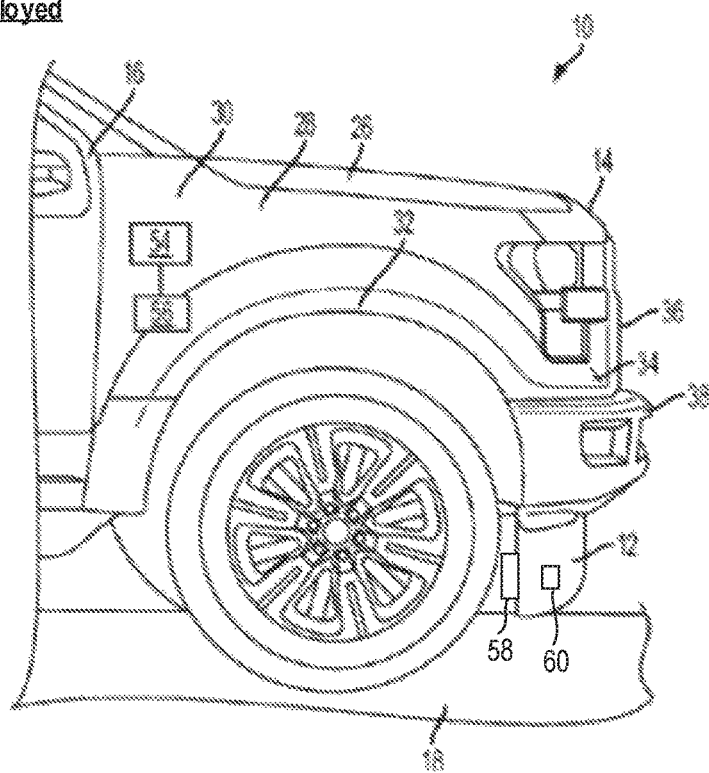
Figure 4:
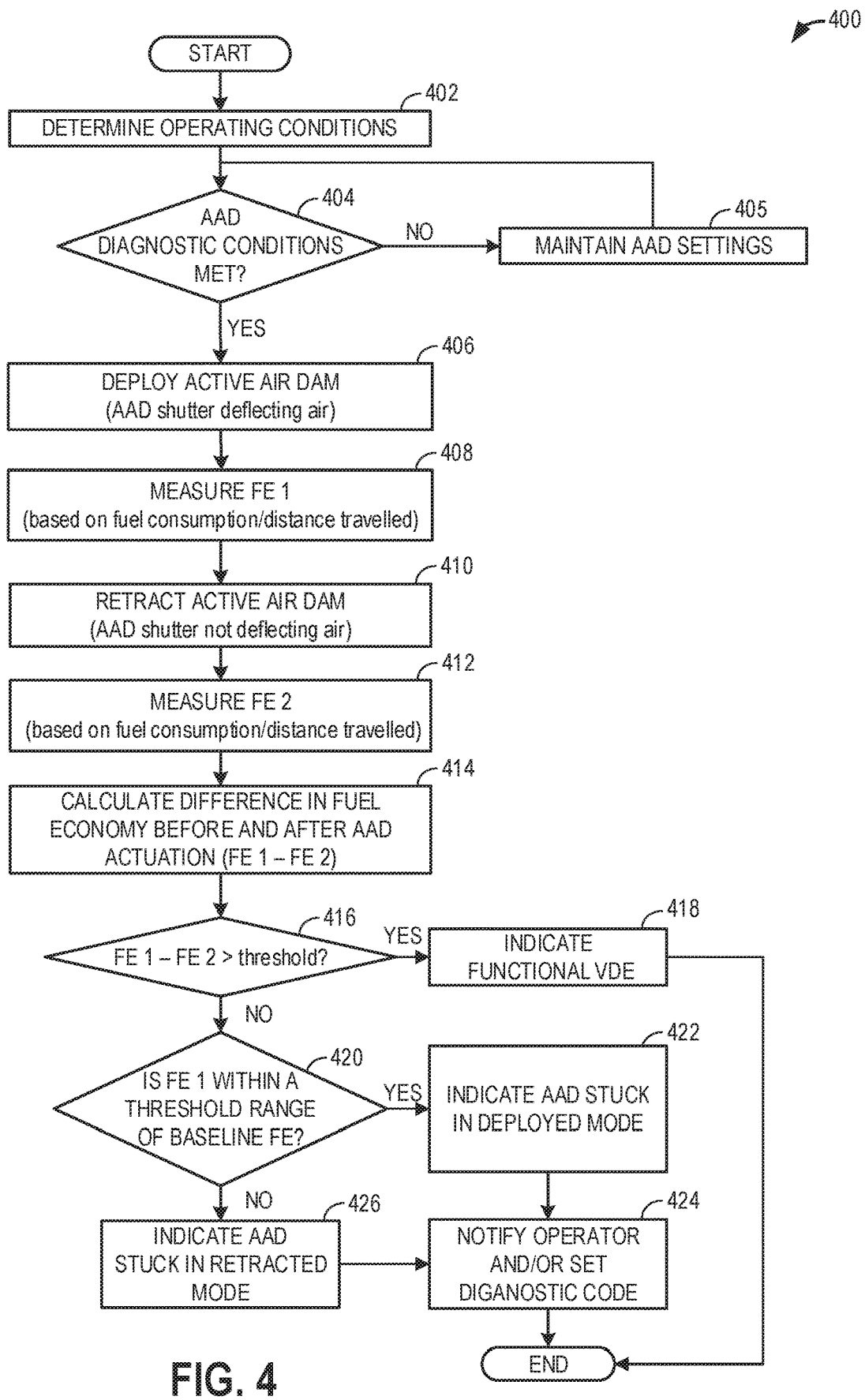
FIG. 4 shows a flow chart illustrating a method for diagnosing degraded AAD mechanisms based on fuel economy.
Figure 5:
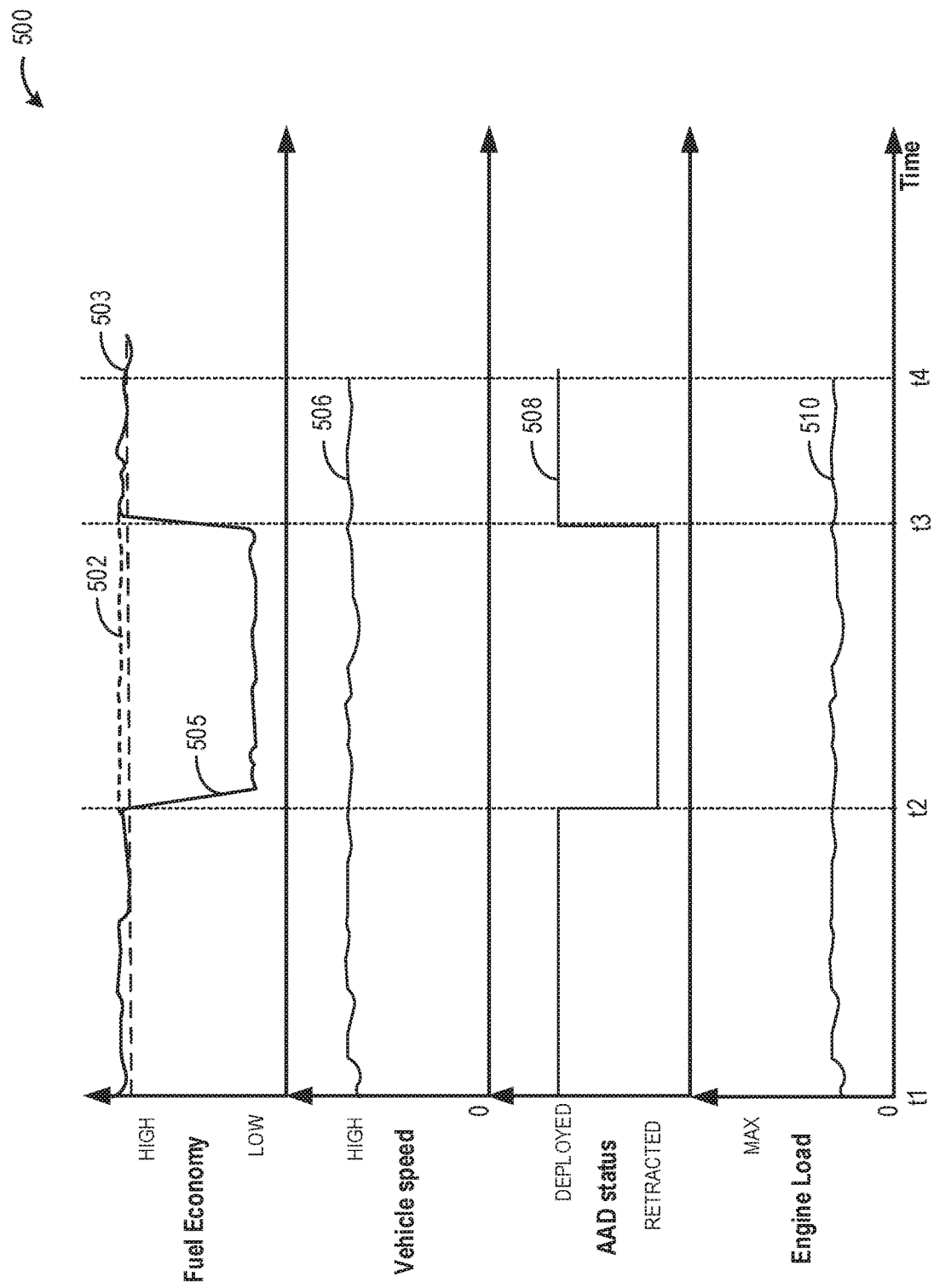
FIGS. 5-6 show prophetic example maps of engine operating parameters during a diagnosis of AAD system hardware.
Figure 6:
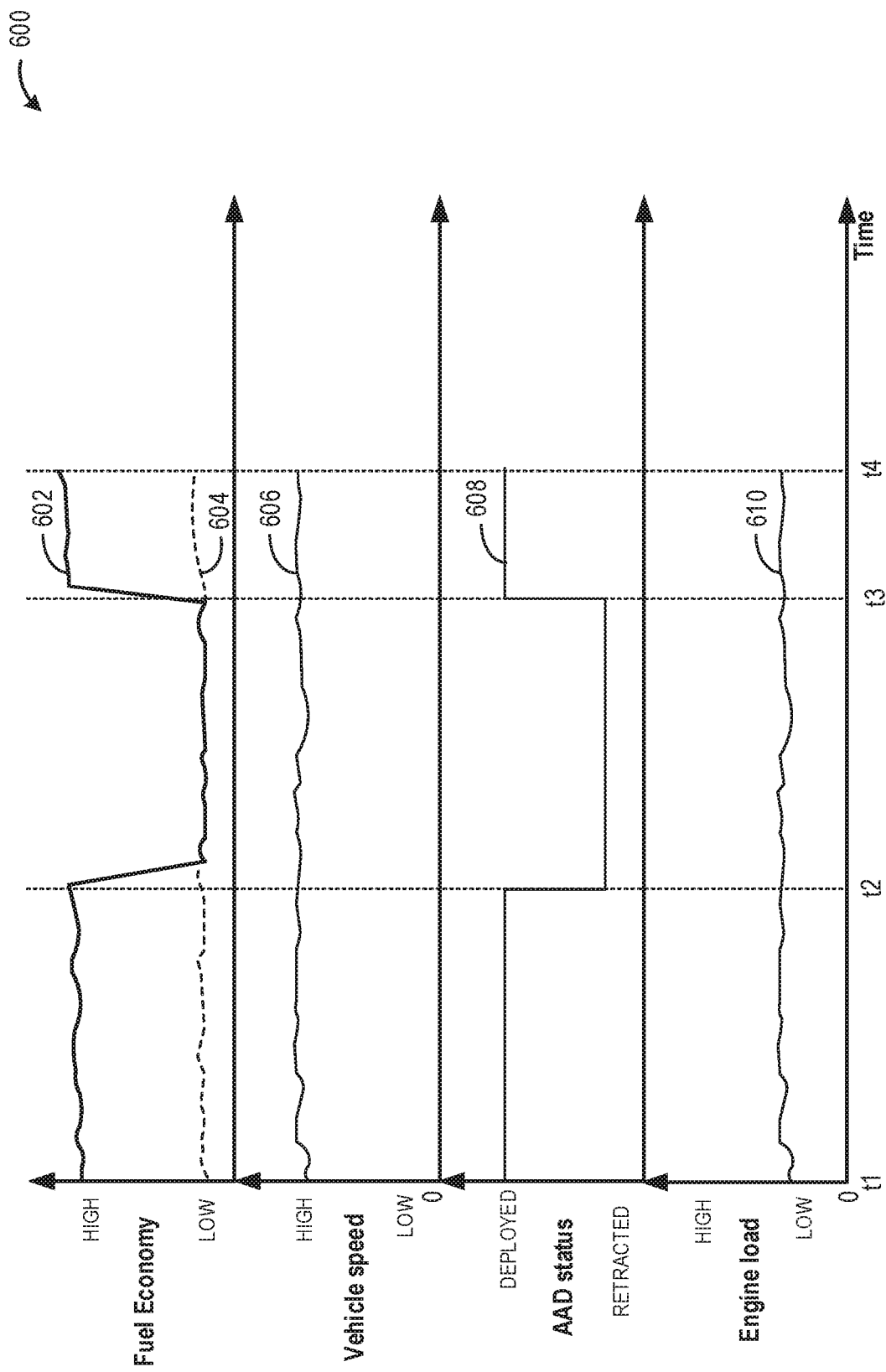

The following description relates to a method for diagnosing active air dam systems and associated hardware in a vehicle, as shown in FIGS. 1A-1B. The vehicle may be propelled with at least torque from an engine, such as the engine shown in FIG. 2. A controller may operate an AAD mechanism of a vehicle system based on vehicle operating conditions, such as shown at the control routine of FIG. 3, and the example of FIG. 7. The controller may also direct an AAD system diagnostic routine during steady-state vehicle speeds, wherein the controller may selectively actuate the shutter (or flap) of the AAD system between a deployed and a retracted position and use the resulting fuel economy metric to identify degradation of AAD hardware, as shown with reference to the example operation illustrated in FIG. 4. Prophetic example diagnostic routines performed during engine operations are shown at FIGS. 5-6.

FIG. 1A and FIG. 1B illustrate a side perspective view of a passenger vehicle 10 including an aerodynamic device coupled to a vehicle body, depicted as an active air dam (AAD) system configured herein as a front air dam panel 12. Herein, AAD panel 12 is also referred to as a shutter of the AAD. In FIG. 1A, the air dam panel 12 is raised up to a stowed or retracted position. FIG. 1B illustrates the air dam panel 12 in a deployed position where the air dam is lowered.

FIGS. 1A and 1B illustrate the front end 14 of the vehicle 10 that is a truck or sport utility vehicle having a vehicle body 16 elevated relative to an underlying support surface 18 upon which the vehicle 10 travels.

The front end 14 of the vehicle 10 includes an area forward of a passenger compartment in the longitudinal direction. The front end 14 includes a hood 26 defining an engine compartment 28 there beneath. The front end also includes front quarter panels 30 on opposed lateral sides of the vehicle 10. Each quarter panel 30 defines a front wheel well 32 is illustrated on a right side of the vehicle 10. The left quarter panel is generally a mirror image. The engine compartment 28 is located laterally between the quarter panels 30.

The front end 14 also includes a front fascia 34. The front fascia 34 is generally located forward of the hood 26 and quarter panels 30. The front fascia 34 includes the front grille 36 and the bumper 38. The front grille 36 defines an opening to the engine compartment 28 in order to allow airflow into the air induction system and for cooling of the engine compartment 28. The grille 36 may be designed for vehicle styling and aesthetic appeal and may also include the vehicle manufacturer logo or may have ornamental design characteristics.

The bumper 38 provides energy absorption in the event of a front impact crash. As illustrated, the bumper 38 may extend forward of the grille 36. However, in other embodiments, the bumper 38 may be generally flush with the grille 36.

While the depicted example shows the air dam panel 12 configured as a front air dam panel coupled to a front bumper of the vehicle, in alternate embodiments, the active air dam system may include side skirts fixed to the side of a vehicle, such as in truck embodiments.

As shown in FIG. 1A, in the retracted position, the air dam panel 12 is stowed behind a front bumper causing an increase in airflow beneath the vehicle (depicted by arrows). This results in aerodynamic drag and lift which degrades fuel economy and reduces drivability. As shown in FIG. 1B, in the deployed position, the air dam panel 12 is moved downward in the vertical direction in order to reduce airflow beneath the vehicle. In the deployed position, the front air dam panel 12 may extend an additional distance below a lower surface 40 of the bumper 38 or the front fascia 34. The air dam panel 12 may be offset from the front bumper 38 so that the air dam panel 12 is not flush with the bumper 38 in the vertical direction. As a result of the deployment of the air dam, ram air is deflected such that a smaller amount of the ram air is directed under the vehicle while a larger portion of the ram air is directed over the vehicle, reducing drag and thereby improving fuel economy and vehicle drivability.

Unlike air dams which extend from the bumper and are located close to the ground to prevent air from flowing underneath the vehicle, trucks and utility passenger vehicles like those illustrated in FIGS. 1A and 1B may maintain a minimum ground clearance in order to prevent colliding with obstacles under certain road condition. Therefore, the front air dam panel 12 can be moved to the deployed position illustrated in FIG. 1B when road conditions are determined to be safe.

A deployable air dam assembly 50 may also include a controller 54 configured with instructions that when executed cause the air dam panel 12 between to be actively actuated between the deployed position and the retracted position. In particular, controller 54 may command control signals to a mechanical linkage 58 coupling the air dam panel 12 to a body of vehicle 10. The mechanical linkage 58 may be configured, in one example, as a mechanical arm. As elaborated with reference to FIG. 3, AAD actuation may be adjusted as a function of varying vehicle operating conditions. The controller 54 may command the linkage to raise the AAD panel behind the bumper to transition the AAD to the retracted or stowed position. For example, the AAD panel may be stowed at low to mid vehicle speeds, during in-city driving, or when the vehicle is parked. The controller 54 may also command the linkage to lower the AAD panel below the bumper to transition the AAD to the deployed position. For example, the AAD panel may be deployed at mid to high vehicle speeds or when the vehicle is cruising on a highway.

In the deployed position (FIG. 1B), the air dam panel 12 is lowered to a closer distance to the driving surface. The air dam panel 12 prevents some of the air from flowing beneath the vehicle and along the vehicle underbody by redirecting flow around the vehicle instead. As a result, aerodynamic flow is improved. The improved aerodynamic flow, particularly at higher vehicle speeds, results in an improvement in vehicle fuel economy. In comparison, in the retracted or stowed position (FIG. 1A), the air dam panel 12 is located substantially above the driving surface 18 and does not generally redirect airflow. As a result, aerodynamic drag can occur, particularly at higher vehicle speeds, causing a drop in vehicle fuel economy. As elaborated with reference to FIG. 4, the change in fuel economy with the change in position of the AAD can be used as a metric to diagnose the AAD for potential hardware issues.

It will be appreciated that while the depicted example illustrates two settings for the AAD (deployed and retracted), this is not meant to be limiting. In other embodiments, one or more intermediate positions or settings.

The air dam panel 12 may be capable of being positioned at many different deployed positions based on vehicle speed or environmental conditions, for example. The air dam controller 54 may control the deployed position of the air dam panel 12 based on speed or road obstacles. For example, the air dam panel 12 may be raised to the stowed position if the vehicle is being driven at lower speeds where there is not large drag, or if an obstacle is detected that could potentially damage the air dam panel 12 is detected a vehicle sensor 56.

Vehicle sensor 56 may be any type of device used for detecting distance between the vehicle 10 and an externally located object, such as radar, a camera, LIDAR or even vehicle-to-vehicle communication.

The vehicle 10 may also include a position sensor 60 that is coupled to air dam panel. In an alternate example, the position sensor 60 may be coupled to the linkage 58 of the air dam panel. The sensor 60 may estimate a position of the air dam panel. In particular, an output of position sensor 60 may change responsive to a commanded change in position of the air dam panel between the deployed and retracted positions. However, the position sensor 60 may be prone to degradation. For example, the sensor may freeze causing an erroneous signal to be output.

Vehicle sensors 56, 60 are in communication with controller 54 and provide data signals to the controller 54. The controller 54 may identify a change in AAD position, as commanded, based on a change in output of sensor 60 following a change in signals commanded to linkage 58. Additionally, degradation of the hardware associated with the AAD, such as degradation of air dam panel 12 or linkage 58 may be identified based on a lack of change in output of the sensor 60 following a commanded transition between deployed and retracted positions. As elaborated at FIG. 3, AAD actuation between deployed and retracted states may be adjusted based on a plurality of factors including current vehicle operating conditions such as vehicle speed, as well as operating conditions projected along a route of travel. As further elaborated at FIG. 4, degradation of AAD hardware may be better differentiated from position sensor degradation based on a fuel economy change following the commanded transition of the AAD between deployed and retracted positions.

It will be appreciated that the vehicle may have additional or alternate aerodynamic devices such as a moonroof coupled to a roof of the vehicle body, side skirts coupled to a side of the vehicle (such as in configurations where the vehicle is a truck), as well as passive air dams. The diagnostic routine of FIG. 4 may be similarly applicable for any of the above-mentioned aerodynamic devices of the vehicle.

Figure 2:
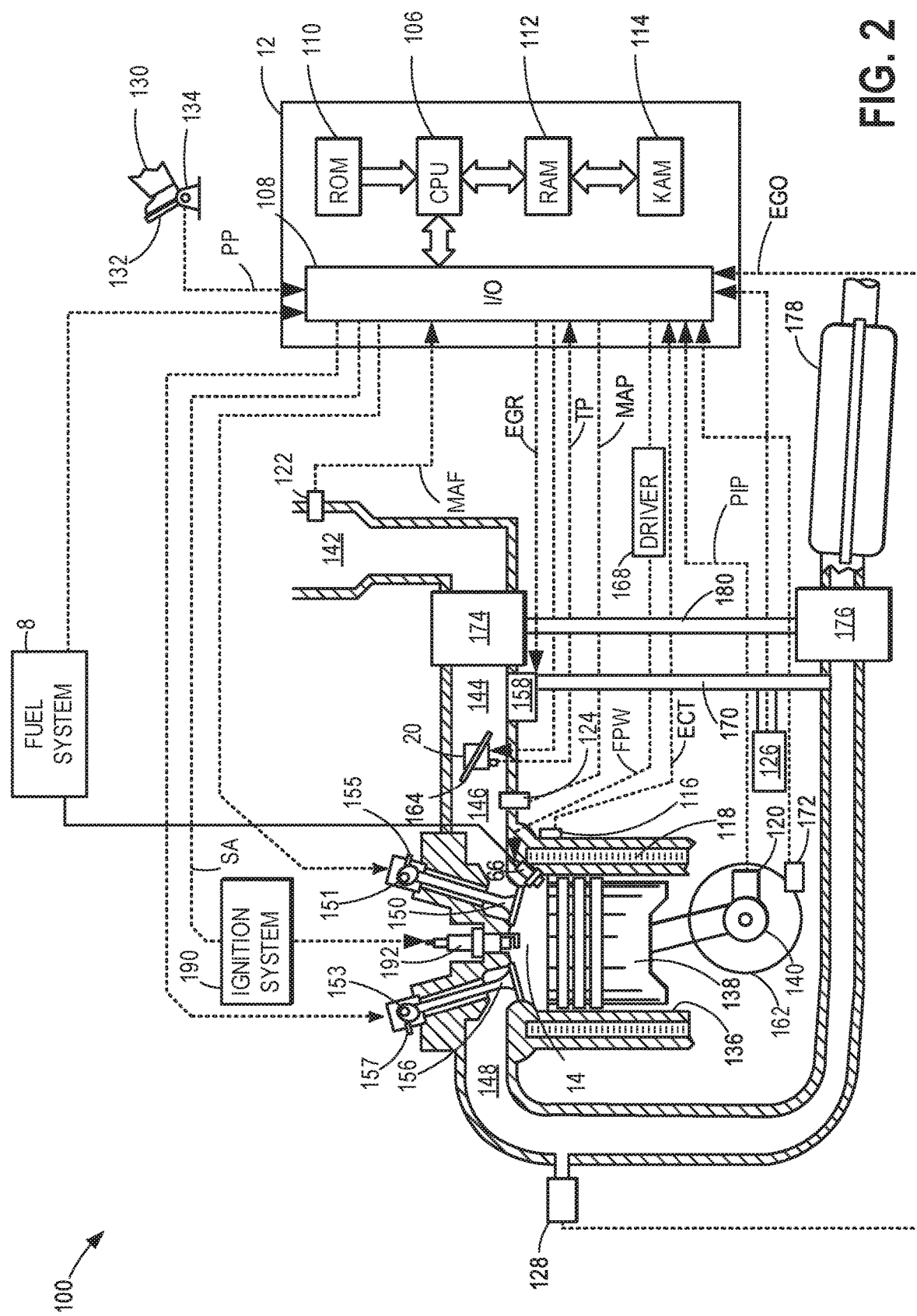
FIG. 2 shows a partial engine view.

FIG. 2 depicts an example embodiment of a combustion chamber or cylinder of internal combustion engine 100, such as an engine coupled to vehicle 10 of FIGS. 1A-1B. Engine 100 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 100 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to a flywheel 162 and at least one drive wheel of the passenger vehicle via a transmission system. Further, a starter motor 172 may be coupled to crankshaft 140 via flywheel 162 to enable cranking (e.g., spinning) of engine 100, typically used for starting the engine. When starting an engine, after combustion occurs, actuation of the starter is ceased as combustion facilitates spinning of the engine. In one example, starter motor 172 may be a conventional starter motor. In other examples, starter motor 172 may be an integrated starter motor, such as those typically found on hybrid vehicles.

Cylinder 14 may receive intake air via a series of air intake passages 142, 144, and 146. Intake air passage 146 can communicate with other cylinders of engine 100 in addition to cylinder 14. In some embodiments, one or more of the intake passages may include a boosting device such as a turbocharger or a supercharger. For example, FIG. 2 shows engine 100 configured with a boosting device configured as a turbocharger. Turbocharger includes a compressor 174 arranged between intake passages 142 and 144, and an exhaust turbine 176 arranged along exhaust passage 148. Compressor 174 may be at least partially powered by exhaust turbine 176 via a shaft 180. A charge air cooler (not shown) may be optionally included downstream of compressor 174. However, in other examples, such as where engine 100 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 100 in addition to cylinder 14. Exhaust gas sensor 128 is shown coupled to exhaust passage 148 upstream of emission control device 178. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Exhaust passage 148 and intake passage 144 may be fluidically coupled via an EGR tube 170 (e.g., EGR passage) that serves to recirculate exhaust gas from the exhaust passage to the intake passage. Flow through the EGR tube 170 is controlled by an EGR valve 158, which regulates the quantity of recirculated exhaust gas. The EGR valve 158 may be a continuously variable valve wherein a position of the valve is continuously variable from a fully closed position to a fully open position. An EGR pressure sensor 126 may be coupled to the EGR system in order to determine the exhaust gas flow rate. In one example, EGR pressure sensor 126 may be a differential pressure sensor that measures the change in exhaust flow pressure before and after a restriction (e.g., orifice) in the EGR tube 170 that leads up to the EGR valve 158. In another example, the EGR pressure sensor 126 may be a Delta Pressure Feedback Exhaust (DPFE) sensor. In other examples, other suitable sensor configurations may be used. EGR pressure sensor 126 may send time-based EGR signals to the controller during nominal engine operation. Nominal engine operation is considered an ignition-on condition when the engine is operated in response to operator torque demands.

The controller may selectively actuate a vacuum solenoid (not shown) to actuate the EGR valve 158. The controller may actively control the EGR valve via the vacuum solenoid based on various engine signals. In one example, the controller may receive an indication of engine coolant temperature (ECT) from temperature sensor 116 coupled to cooling sleeve 118, a throttle position (TP) from a throttle position sensor, an exhaust gas flow measurement from EGR pressure sensor 126, or an absolute manifold pressure signal (MAP) from sensor 124 to regulate the vacuum solenoid.

Each cylinder of engine 100 may include one or more intake valves and one or more exhaust valves. For example, cylinder 14 is shown including at least one poppet-style intake valve 150 and at least one poppet-style exhaust valve 156 located at an upper region of cylinder 14. In some embodiments, each cylinder of engine 100, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In some embodiments, each cylinder of engine 100 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 100 may initiate combustion by auto-ignition or by injection of fuel as may be the case with some diesel engines.

In some embodiments, each cylinder of engine 100 may be configured with one or more fuel injectors for providing fuel thereto. As a non-limiting example, cylinder 14 is shown including one fuel injector 66. Fuel injector 66 is shown coupled directly to cylinder 14 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 14. While FIG. 2 shows fuel injector 66 as a side injector, it may also be located overhead of the piston, such as near the position of spark plug 192. Such a position may facilitate mixing and combustion when operating the engine with an alcohol-based fuel due to the lower volatility of some alcohol-based fuels. Alternatively, the injector may be located overhead and near the intake valve to facilitate mixing. Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 66 may be a port injector providing fuel into the intake port upstream of cylinder 14.

It will also be appreciated that while the depicted embodiment illustrates the engine being operated by injecting fuel via a single direct injector, in alternate embodiments, the engine may be operated by using two injectors (for example, a direct injector and a port injector) and varying a relative amount of injection from each injector. As described above, FIG. 2 shows one cylinder of a multi-cylinder engine. As such each cylinder may similarly include its own set of intake/exhaust valves, fuel injector(s), spark plug, etc.

For a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as exhaust gas (EGO) sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 100, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, exhaust gas flow from EGR pressure sensor 126, and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1A-2 and employs the various actuators of FIGS. 1A-2 to adjust vehicle and engine operation based on the received signals and instructions stored on a memory of the controller. For example, responsive to a vehicle or engine speed sensor being indicative of a vehicle highway cruising condition, or a mid-high vehicle speed, the controller may send a signal to an AAD actuator (e.g., AAD linkage) to deploy the AAD, wherein the AAD is lowered to a front of the vehicle so that air can be deflected underneath and over the vehicle in an aerodynamic manner. As another example, responsive to the vehicle or engine speed sensor being indicative of city driving conditions, or a low-mid vehicle speed, the controller may send a signal to the AAD actuator (e.g., AAD linkage) to retract the AAD, wherein the AAD is raised to a location under or behind the vehicle's front bumper so that air can flow below the vehicle in a manner that can generate drag and lift. Further still, responsive to AAD diagnostic conditions being met, the controller may sequentially deploy and then retract the AAD while estimating changes in fuel usage to diagnose the AAD hardware.

Non-transitory storage medium read-only memory chip 110 can be programmed with computer readable data representing instructions executable by microprocessor unit 106 for performing the methods described below as well as other variants that are anticipated but not specifically listed.

In this way, the components of FIGS. 1A-2 enable a vehicle system comprising an engine; an active air dam (AAD) coupled to a vehicle bumper via a linkage; and a controller storing instructions in non-transitory memory executable to: command the linkage to actuate the air dam between a deployed position where the air dam is lowered below the bumper, and a retracted position where the air dam is raised for stowage behind the bumper; and indicate degradation of the AAD responsive to a change in average fuel economy following the command being less than a threshold change. The instructions may be executable to indicate that the degradation of the AAD includes the AAD being stuck in the deployed position based on the average fuel economy following the command being substantially equal to a baseline fuel economy. Further, the instructions may be executable to indicate that the degradation of the AAD includes the AAD being stuck in the retracted position based on the average fuel economy following the command being less than the baseline fuel economy. In some example embodiments, the commanding and indicating occur on a current drive cycle of the vehicle, wherein the instructions are executable to, during a prior vehicle drive cycle, command the linkage to lower the AAD to the deployed position during steady-state vehicle cruising conditions and determine the baseline fuel economy based on fuel usage over time on the prior vehicle drive cycle. Responsive to the indication of the AAD being stuck in the deployed position, the controller may set a first diagnostic code and limit the vehicle's off-road ability. For example, the vehicle may only be allowed to drive on paved roads. In addition, the active suspension system of the vehicle may be raised at lower vehicle speeds. In comparison, responsive to the indication of the AAD being stuck in the retracted position, the controller may set a second, different diagnostic code. Due to the fuel economy being more degraded in the stuck retracted position, trip planning during subsequent drive cycles may take the degradation in fuel economy into account. For example, if a given navigational route is more fuel efficient on the highway with the AAD deployed, it may be considered to also be more efficient as a city route with the AAD stuck retracted. In either case, with the AAD stuck deployed or retracted, once AAD degradation is confirmed, the heavily averaged fuel economy value that is displayed to a vehicle operator may be reset to flush out the history content. Instead, a new fuel economy average that is more reflective of the degradation level may be displayed as average fuel economy history may be biased from a functioning AAD. Furthermore, in some example embodiments, a position sensor may be coupled to the AAD, and the instructions at the controller may be executable to differentiate between AAD degradation and position sensor degradation responsive to a change in position sensor output following the command relative to the change in average fuel economy following the command.

Figure 3:
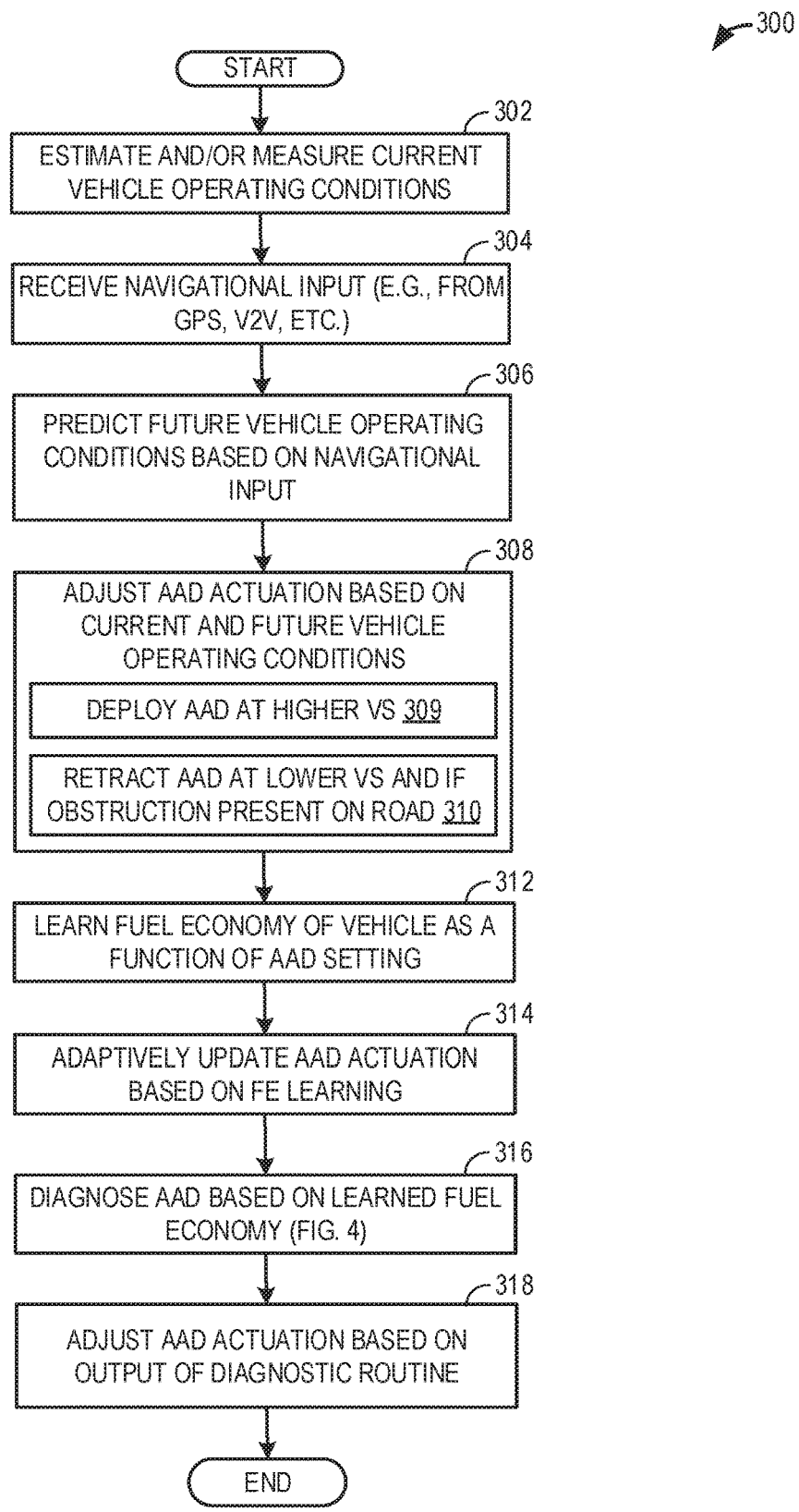
FIG. 3 shows a flow chart illustrating a method for operating am AAD mechanism during vehicle operation to improve fuel economy.
Figure 7:
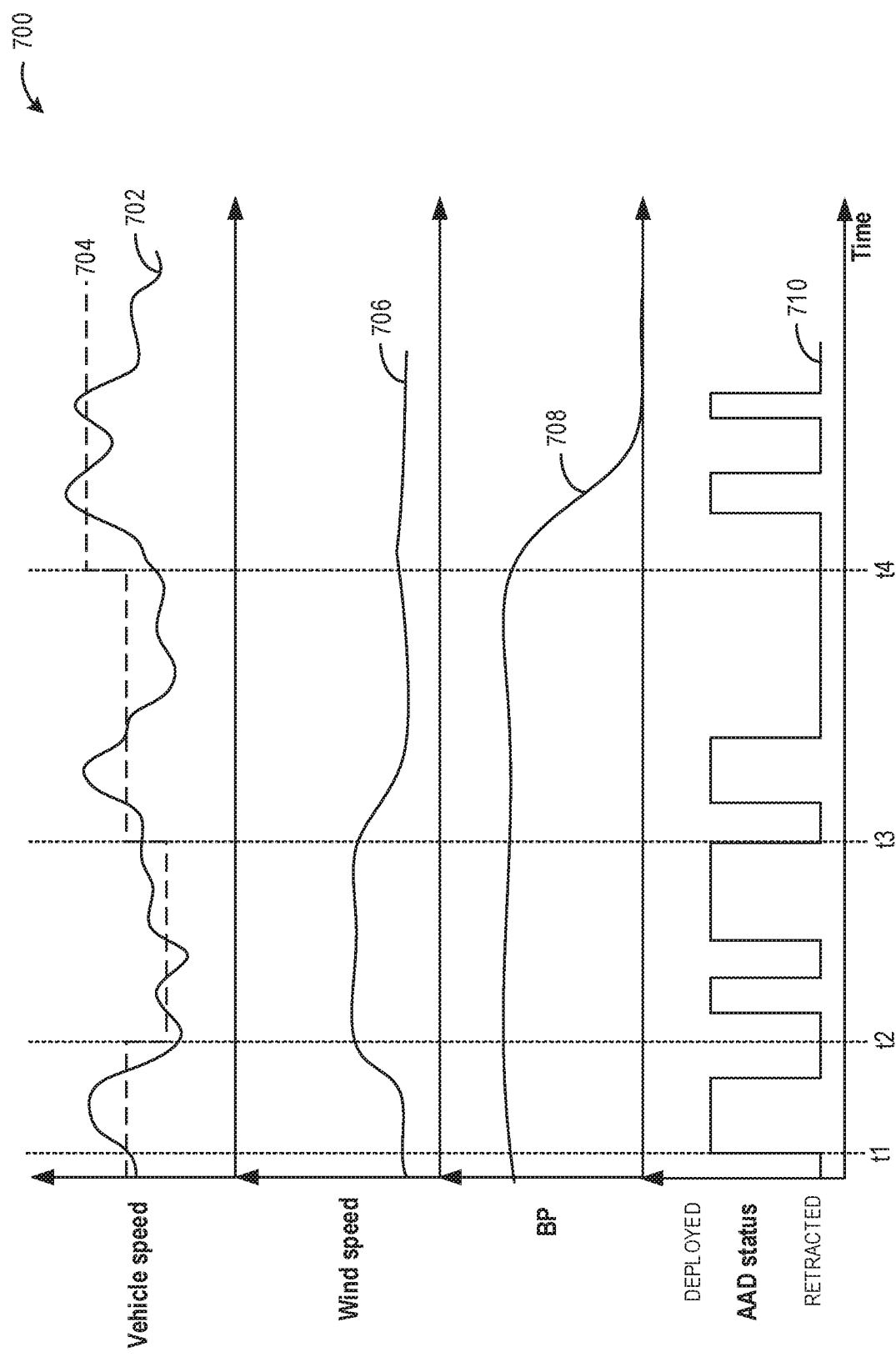
FIG. 7 shows a prophetic example of changing AAD settings with change in vehicle operating conditions.

Turning now to FIG. 3, a flow chart illustrating an example method 300 for operating an AAD system for a vehicle (e.g., AAD 12 coupled to vehicle 10 in FIGS. 1A-1B) is shown. The method enables the air dam to be deployed during conditions when a deflection of air flow over the vehicle can provide an improvement in fuel economy. The air dam may be stowed during other conditions when a fuel economy improvement is not achieved, as well as during conditions when the dam can get damaged. The controller may rely on vehicle operating conditions estimated in real-time during vehicle travel, as well as predicted operating conditions over a remainder of a vehicle route, as inferred based on navigational input. In this way, AAD actuation can be leveraged for improving vehicle performance. An example of AAD transition between deployed and retracted positions responsive to change in vehicle operating conditions is shown at FIG. 7.

Instructions for carrying out method 300 and other methods described herein may be executed by a controller based on instructions stored on a memory of the controller and in conjunction with the AAD mechanisms as described above with reference to FIGS. 1A-1B. The controller may employ actuators of the AAD system (e.g., linkages, shutters, flaps, etc.) to adjust AAD operation, according to the methods described below At 302, the method includes estimating and/or measuring current vehicle operating conditions including operator torque demand, engine speed, vehicle speed, ambient conditions including ambient temperature, pressure, and humidity, manifold air flow and pressure, boost pressure, engine dilution, exhaust catalyst temperature, engine temperature, etc. In hybrid vehicle embodiments, the vehicle operating conditions may further include battery state of charge, HEV motor torque, and battery temperature.

At 304, navigational input is received at the controller. The navigational input may include input regarding conditions affecting vehicle operation. For example, the controller may receive input from a navigational device of the vehicle (e.g., a GPS device) regarding road grade, road conditions (e.g., presence of speeds bumps, potholes, etc.), traffic conditions, weather conditions (e.g., presence and nature of precipitation, wind direction and speed), etc. The controller may also receive information broadcast from other vehicle systems regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, the vehicle controller may be communicatively coupled to other vehicles or infrastructures via a wireless network and the internet (e.g. cloud), as is commonly known in the art.

In some examples, various vehicle system sensors, may be utilized in conjunction with the onboard navigation system to conduct route learning of commonly traveled routes by the vehicle. As one example, route-learning methodology may comprise information related to learned duration of stops along learned driving routines, where the engine may be stopped as a result of a start/stop feature, or stopped for other reasons (e.g. between drive cycles). In some examples, such learned duration of stops where the engine may be shut down may include information acquired wirelessly via the control system, where such information may include traffic light status (e.g. how long until a particular traffic light turns green), traffic conditions that relate to how long a particular stop may last, etc.

At 306, the controller may predict future vehicle operating conditions based on the received navigational input. For example, the controller may predict conditions such as road grade, presence of obstructions on the road, traffic conditions, possibility of precipitation (e.g., rain or snow), changes in ambient temperature, pressure, and humidity conditions, etc., further along the planned route of travel.

At 308, the method includes adjusting actuation of the AAD based on current and future (predicted) vehicle operating conditions. In particular, changes in aerodynamic flow enabled via actuation of the AAD are leveraged to improve fuel economy, when possible. For example, at 309, the AAD may be actuated to a more deployed position at higher vehicle speed conditions, such as at or above 50 mph. By deflecting air around the sides and over the vehicle at higher vehicle speeds, a lower portion of ram air flows underneath the vehicle. As such, the air flowing under the vehicle may cause an aerodynamic flow pattern that generates lift and reduces vehicle drivability. As another example, at 310, the AAD may be actuated to a more stowed position at lower vehicle speed conditions, such as below 50 mph.

Other factors that may impact the actuation of the AAD include road conditions. For example, the AAD may be stowed if an obstruction is identified or expected on the road. This may include an obstruction viewed by a camera, based on a notification from the GPS device, or inferred based on V2V communication. The obstruction may include downed trees or branches, rocks from a landslide onto the road, a cone or other object indicating a detour on the road, dead animal, etc. By stowing the AAD in response to the identification of an obstruction, damage to the AAD shutter from impact with the obstruction is averted. In the same way, the AAD may be deployed if camera input and navigational input indicates that there is no obstruction for a longer than threshold distance ahead of the vehicle in the direction of travel (e.g., long section of good road).

AAD actuation may also be responsive to the output of a diagnostic code related to AAD functionality. If an earlier iteration of an AAD diagnostic routine (such as the routine of FIG. 4) indicates that the AAD is degraded (e.g., stuck open or stuck closed), then the AAD may not be actuated until the vehicle has been taken to a service provider and a diagnostic code related to the AAD has been reset.

As yet another example, the presence of wind, wind speed, and wind direction may affect the AAD schedule. For example, if the direction of wind flow is in the same direction as vehicle travel (that is, the wind is behind the vehicle in an aft-to-for direction), then the AAD may be maintained stowed, even at higher vehicle speeds. This is because the direction of the wind may not provide a significant aerodynamic improvement with the AAD lowered to the deployed position, and therefore no significant improvement in fuel economy. Therefore, in such a situation, it may be more favorable to maintain the AAD stowed. Likewise, the AAD may be actuated to the deployed position responsive to wind speed changing less than a threshold in the for-to-aft direction.

As elaborated with reference to FIG. 7, the controller may adjust a threshold vehicle speed for actuating an active air dam coupled to a vehicle body as a function of a plurality of vehicle operating parameters including barometric pressure, altitude, wind direction, wind speed, and ram air density; and then actuate the active air dam based on vehicle speed relative to the adjusted threshold speed. The active air dam may be actuated to a more deployed position when vehicle speed exceeds the threshold speed, and actuated to a more retracted position when vehicle speed is below the threshold speed. As an example, the threshold vehicle speed may be lowered as a wind speed in an aft-to-for direction of vehicle motion (or tail wind) increases. As another example, the threshold vehicle speed may be raised as barometric pressure decreases or altitude increases.

As a further example, AAD actuation may be adjusted based on learned driver behavior, such as based on whether the operator tends to drive aggressively (e.g., lead footed) or in a fuel economical manner, whether the driver has a preference for a sport mode or green mode of vehicle operation, etc. As an example, the AAD may be actuated to the deployed position more frequently (or maintained in the deployed position for a longer duration) when the operator indicates a preference for fuel economy.

AAD actuation may also be enabled responsive to ambient conditions that result in changes in air density. Since aerodynamic flow and the associated fuel economy improvement is a function of air density, changes in air temperature, pressure, and humidity that increase air density may cause the AAD to be deployed to improve the aerodynamic flow. Likewise, AAD actuation may be adjusted responsive to engine cooling requirements so that the actuation of the AAD is coordinated with operation of cooling system components including a radiator fan. In one example, deployment of the AAD may cause less air to flow through the underside of the vehicle, resulting in lower under-hood cooling. Therefore, when the AAD is deployed, a radiator fan speed may be need to be increased to enable engine temperature control. As another example, the AAD may be deployed when engine cooling is not required, and the AAD may be stowed when engine cooling is required.

It will be appreciated that while the above scenarios discuss automatic deployment or stowage of the AAD shutter responsive to a specified operating condition, in still further examples, AAD deployment or stowage may be responsive to an active operator request to deploy or stow the AAD shutter. For example, the vehicle may include an AAD button that enables the vehicle operator to manually override any automatic actuation of the AAD, thereby allowing the AAD to be stowed when the controller would otherwise deploy the AAD, or deploy the AAD when the controller would otherwise stow the AAD.

At 312, the method includes learning the fuel economy of the vehicle as a function of the AAD setting, and further as a function of the operating conditions corresponding to the AAD setting. Fuel economy (FE) may be learned based on fuel usage, for example. Fuel economy of the vehicle may also take into account distance travelled by the vehicle (e.g., miles). As an example, if the AAD is enabled responsive to vehicle speed, the average speed at which the vehicle speed operates when the AAD is deployed may be learned, and an associated FE may also be learned. As another example, if the AAD is enabled responsive to engine cooling, the average engine temperature when the AAD is deployed or stowed may be learned, and an associated FE may also be learned. In one example, a vehicle controller may populate a map or look-up table of various engine and vehicle operating parameters with a first fuel economy value corresponding to operating with the AAD deployed and a second fuel economy value corresponding to operating with the AAD stowed. Then, the controller may adaptively learn and update AAD actuation based on the FE learning. For example, if the adaptive learning indicates that the FE is lower at a given average vehicle speed, then the AAD may be actuated to the deployed position earlier, and at a lower vehicle speed to improve the fuel economy. As another example, if the adaptive learning indicates that there is no significant FE improvement with the AAD deployed or stowed at a given altitude, then the AAD may be maintained stowed when the vehicle operates at the given altitude, independent of other vehicle speeds. As such, the adaptive learning performed on each drive cycle can be used to update or refine an AAD actuation look-up table for use on subsequent drive cycles.

At 316, the method includes diagnosing the AAD based on the learned fuel economy. As elaborated with reference to FIG. 4, a change in fuel economy measured following a commanded change in the state of the AAD is used to infer if the AAD is degraded (e.g., stuck open or stuck closed) or not. The diagnostics may be performed opportunistically, such as while the AAD is actuated to the deployed or stowed positions responsive to changes in vehicle operating conditions such as vehicle speed. Alternatively, the diagnostics may be active enabled responsive to predicted conditions being conducive for diagnostics. For example, the diagnostics may be conducted when navigational input indicates that the vehicle will be operating in steady-state for a longer than threshold duration (e.g., at least 10 minutes) with no anticipated obstructions on the road. A detailed description of an example AAD diagnostic routine that is based on a fuel economy metric is shown at FIG. 4.

At 318, the method includes adjusting the AAD actuation schedule based on the output of diagnostic routine, if required. For example, if the AAD diagnosis indicates that the AAD is stuck in the more deployed position, then the controller may limit the vehicle's off-road ability and raise the active suspension system at lower vehicle speeds. For exmaple, the vehicle speed at which the suspension system is raised may be lowered relative to a default speed that is used for a evehicle having a functional AAD. Else, if the AAD diagnosis indicates that the AAD is stuck in the more retracted position, then the controller mayadjust subsequent vehicle trip planning to select a navigational route that provides more fuel economy. For example, a naviagtional bias during trip planning may be changed towards a bias for fuel economy (over a bias for time to destination, distance to destination, or vehicle performance).

It will be appreciated that the vehicle may have additional or alternate aerodynamic devices such as a moon-roof coupled to a roof of the vehicle body, and side skirts coupled to a side of the vehicle (such as in configurations where the vehicle is a truck). These devices may be similarly operated as a function of vehicle speed. Further, the vehicle may have passive air dams. Some trucks may also have fixed (passive) air dams that are always deployed. Going off-road can damage these passive air dams as they are always deployed. Hence, the diagnostic for the passive air dams may be one-sided, that is, the routine may diagnose if the air dam is retracted. Further, for vehicle embodiments having multiple aerodynamic devices (such as a moon-roof and an AAD), prior to executing a diagnostic for the AAD, it may be confirmed that the other aerodynamic devices are in their default state (e.g., the moon-roof is closed). By including moon-roof closure in the AAD diagnostic entry conditions, it may be ensured that the result of the diagnostic routine is not obscured or polluted by the moon-roof adding additional aerodynamic drag on the vehicle.

An example operation of an AAD mechanism in a vehicle is now described with reference to FIG. 7. Map 700 depicts vehicle speed at plot 702. A variable vehicle speed threshold that is used to actuate the AAD mechanism is shown at dashed plot 704. The speed threshold changes in changing vehicle operating conditions, such as wind speed in an aft-to-for direction as shown at plot 706, and barometric pressure (or altitude) as shown at plot 708. Still other parameters may be accounted for which are not shown in the depicted example. The AAD mechanism may be actuated (plot 710) to a deployed state when the vehicle speed exceeds threshold 704, and to a retracted state when the vehicle speed falls below threshold 704. All plots are shown over time, along the x-axis.

Prior to t1, the vehicle speed is lower than threshold 704 and so the vehicle is operating with the AAD retracted, such as via a command that causes a linkage arm to raise an AAD shutter to a position behind a front bumper of the vehicle. At this speed, there is no significant air drag on the vehicle. At t1, the vehicle speed exceeds threshold 704 and so the AAD is actuated to a deployed position, such as via a command that causes the linkage arm to lower the AAD shutter from behind the front bumper of the vehicle to below the bumper. From t0 to t2, the vehicle speed threshold 704 is a default speed threshold.

At t2, there is an increase in the aft-to-for wind speed. As a result, there is now a wind acting on the vehicle from behind, in the direction of vehicle motion (also called tail wind). As such, the AAD is able to deflect oncoming air (ram air, head wind, or wind in a for-to-aft direction) to achieve improved aerodynamic flow. Responsive to the tail wind, the vehicle speed threshold 704 is lowered. Consequently, between t2 and t3, the AAD is deployed when vehicle speed exceeds a lower speed threshold 704, as compared to before t2. At t3, the tail wind discontinues and the vehicle speed threshold is returned to the default value. Between t3 and t4, the AAD is deployed when vehicle speed exceeds the default speed threshold 704.

At t4, there is a decrease in barometric pressure (BP), such as due to the vehicle operating in an area of higher altitude (than before t4). As a result of the decrease in BP, the air density decreases, reducing the net aerodynamic drag on the vehicle. Responsive to the increase in altitude and decrease in BP, the vehicle speed threshold 704 is raised. Consequently, after t4, the AAD is deployed when vehicle speed exceeds a higher speed threshold 704, as compared to before t4.

In this way, the AAD is deployed responsive to vehicle speed higher than a threshold vehicle speed, and stowed responsive to vehicle speed lower than the threshold vehicle speed, wherein the threshold vehicle speed is adjusted as a function of one or more or each of a plurality of vehicle operating parameters including barometric pressure, wind direction and speed, and air density. In particular, a controller may command an air dam coupled to a vehicle body to a first position responsive to vehicle speed higher than a threshold speed, and to a second position responsive vehicle speed lower than the threshold speed, wherein the threshold vehicle speed is adjusted as a function of each of a plurality of vehicle operating parameters including barometric pressure, wind direction, wind speed, and ram air density. The first position may be a more deployed position and the second position may be more retracted position. The controller may then diagnose the AAD mechanism during steady-state vehicle cruising responsive to fuel usage change of an engine of the vehicle following a transition of the AAD mechanism between the first position and the second position. As in the depicted example, the threshold vehicle speed may be lowered relative to a default threshold speed as a wind speed in an aft-to-for direction (or tail wind) of vehicle motion increases, and the threshold vehicle speed may be raised relative to the default threshold speed as barometric pressure decreases or altitude increases.

Turning now to FIG. 4, a flow chart illustrating an example method 400 for diagnosing a degraded AAD system for a vehicle (e.g., vehicle 10 shown in FIGS. 1A-1B) is shown. Therein, degradation of AAD mechanisms may be diagnosed when the engine is transitioned between operating in an AAD deployed mode with the AAD lowered to deflect ram air, and an AAD-retracted mode with the AAD raised, and the resulting changes in fuel economy are observed.

At 402, the method includes determining vehicle and engine operating conditions. Operating conditions may include vehicle speed, engine speed, engine load, vehicle speed, pedal position, operator torque demand, road grade, throttle position, mass air flow rate, air-fuel ratio, engine temperature, the amount of compressed air in the intake from the turbocharger, oil temperature, etc. In addition, ambient conditions may be estimated such as ambient temperature, pressure, and humidity.

At 404, the method includes determining whether AAD system diagnostic conditions have been met. The AAD system diagnostic conditions may include steady-state vehicle cruising operation. In one example, the AAD system diagnostic conditions may include highway cruising, where the vehicle speed is high and stable and the engine load is low and steady. For example, vehicle highway cruising may include the vehicle operating at a speed of 50 or 60 MPH with the vehicle speed and engine load changing by less than a threshold (such as 5% or 10%) over a given duration, such as a ten or twenty second time period. Additional AAD system diagnostic conditions at 304 may include determining whether a threshold duration has elapsed since completion of the previous AAD system diagnostic routine. For example, the AAD diagnostic routine may be initiated after a duration measured by a threshold number of fuel tank fill-ups, a threshold number of vehicle miles travelled, or other sensor input. If the AAD system diagnostic conditions are not met (the vehicle speed is not in the target range or engine load is high or other such combinations) (e.g., NO at 404), method 400 returns to 402 to continue to determine operating conditions.

However, if the AAD system diagnostic conditions are met (e.g., YES at 404), method 400 proceeds to 406 to enter or maintain an AAD-deployed mode. In the AAD-deployed mode, the active air ram shutter or flap is deployed. As described previously, this may include the controller commanding an actuator to move an AAD linkage so as to lower the shutter to a position at a front of the vehicle, below the front bumper, so that air can be deflected under and around the vehicle. In particular, aerodynamic drag is reduced by deflecting air.

Upon deploying the AAD shutter or flap, method 300 may measure a first fuel economy FE 1 at 408. Fuel economy (FE) calculations may be based on fuel usage, for example. Fuel economy of the vehicle may also take into account distance travelled by the vehicle (e.g., miles). Thus, the first fuel economy of the vehicle may be calculated based on measured fuel consumption relative to a measured distance travelled. In one example, the fuel economy may be determined based on output from one or more engine sensors, including but not limited to the exhaust oxygen sensor (e.g., sensor 128 of FIG. 2), mass air flow sensor (e.g., sensor 122 of FIG. 2), vehicle odometer, and/or engine speed sensor, as well as fuel usage amounts (which may be determined based on fuel injector pulse width/duty cycle, for example).

In one example, the controller may calculate the first fuel economy after the AAD has been actuated or deployed (e.g., after commanding the AAD shutter to be lowered) after a pre-determined time has elapsed (e.g., two minutes, five minutes, etc.) or after a pre-determined elapsed mileage (e.g., five miles, ten miles, etc.), while the vehicle continues to operate at steady-state. In another example, the fuel economy may be calculated intermittently over a specified time period (e.g., once per minute over a five minute time period), and an average fuel economy may be calculated. The FE 1 thus calculated may be stored in the memory of the controller and may be used to diagnose possible degradation of the VDE, as explained below.

At 410, method 400 includes transitioning to an AAD-retracted mode. The AAD system may be retracted or deactivated after the first fuel economy (FE 1) has been measured and stored in the memory of the controller. As described previously, in the AAD-retracted mode, the active air ram shutter or flap is retracted and returned to a stowage location. As described previously, this may include the controller commanding the actuator to move the AAD linkage so as to raise the shutter to a position behind the front bumper where it can be stowed. As a result, air can freely flow under the vehicle. In particular, aerodynamic drag is increased.

At 412, method 400 includes measuring a second fuel economy FE 2. The second fuel economy may be measured by calculating fuel consumption relative to distance travelled, following the command to retract the AAD shutter. The controller may calculate the fuel economy at a pre-determined time or mileage or alternatively measure fuel economy intermittently over a specified time period, and calculate an average FE 2 for the vehicle operating with the AAD retracted. As explained previously, operation with the AAD deployed generates less aerodynamic drag on the vehicle and causes the engine to consume less fuel (and thus operate at a higher fuel efficiency) as compared to operation with the AAD retracted (which generates more aerodynamic drag on the vehicle and causes the engine to operate with a lower fuel efficiency). Thus switching from operating the vehicle with the AAD deployed to operating with the AAD retracted while vehicle operating conditions (such as vehicle speed and engine load) remain steady may result in an expected change (e.g., a decrease) in the measured fuel economy of the vehicle.

At 414, method 400 includes calculating a difference in the fuel economy before and after retraction of the AAD. For example, a difference between the first fuel economy and the second fuel economy (FE 1-FE 2) may be calculated.

At 416, method 400 includes determining if the difference in the fuel economy before and after AAD retraction (FE 1-FE 2) is greater than a threshold difference. The threshold difference may be a non-zero positive value threshold difference, representing a difference in fuel economy below which degradation of the AAD system may be indicated. In one example, the threshold difference may be three miles per gallon (MPG). In another example, the threshold difference may be a relative difference such as a change in fuel economy of 5% or 10%. A vehicle operating in the AAD-deployed mode with the AAD shutter lowered below a front bumper of the vehicle may generate less aerodynamic drag and use less fuel for consumption, thereby improving fuel economy at high speeds, measured as the first fuel economy FE 1. In contrast, when commanded by the controller to operate in the AAD-retracted mode, relatively more fuel may be consumed due to the increased aerodynamic drag, leading to a decrease in the fuel economy of the vehicle, measured as the second fuel economy FE 2. In the example of a functioning AAD system (e.g., AAD not degraded), the difference in the fuel economy before and after AAD retraction (FE 1-FE 2) will be greater than the threshold difference. Thus, if method 400 determines the change in the fuel economy (FE 1-FE 2) is greater than the threshold difference at 416, then the method proceeds to 318 and indicates the AAD system is not degraded. If the VDE system is not degraded, the vehicle may continue to operate with the AAD deployed, whenever operating conditions permit, such as when operating the vehicle at mid to high vehicle speed levels. Method 300 then returns.

However, if at 416 method 400 determines that the change in fuel economy (FE 1-FE 2) is not greater than the threshold difference, the AAD system (e.g., the AAD mechanism or linkage that raises and lowers the AAD shutter) may be degraded. To differentiate between AAD mechanism degradation where the AAD mechanism is stuck in the deployed mode (e.g., where the AAD shutter is lowered and deployed), even during AAD-retracted operation (e.g., when the AAD is not commanded to be deployed), and AAD mechanism degradation where the AAD mechanism is stuck in the AAD-retracted mode (e.g., where the AAD shutter is raised and stowed), even during AAD-deployed operation (e.g., when the AAD is commanded to be deployed), the measured fuel economy may be compared to a baseline fuel economy.

Accordingly, the method proceeds to 420 to further determine if FE 1 is within a threshold range of a baseline FE. The baseline FE may represent the fuel economy of the vehicle during standard fuel economy measurement conditions, such as when the vehicle is travelling at a steady speed (e.g., 50 or 60 MPH) on level ground (e.g., such that engine load is low and not changing). The baseline FE value may be determined by the controller and further stored in the memory of the vehicle controller. The baseline FE may be determined prior to the AAD system transition (e.g., from deployed to retracted) while the vehicle is operating with the first vehicle operating conditions. In some examples, the baseline FE may be determined at the time of vehicle manufacture. Additionally or alternatively, the baseline FE may be established on a highway cruise with the AAD deployed. Further, the baseline FE may be determined and/or updated over the lifetime of the vehicle to account for changes in fuel economy as vehicle components wear. In all of the above examples, the baseline FE may be determined when the AAD system is known to be not degraded and may be determined while the AAD is actively deployed. The threshold range of the baseline FE may be 3%-5% of the baseline fuel economy and may be stored in the memory of the controller.

If the first fuel economy FE 1 is determined to be within the threshold range of the baseline fuel economy (e.g., YES at 420), method 400 at 422 indicates the engine is stuck in the AAD-deployed mode. The engine may be indicated as stuck in the AAD-deployed mode based on the first fuel economy FE 1 being within a threshold range of the baseline fuel economy (e.g., within a 3%-5% range of the baseline FE measured) and further based on the difference between the first fuel economy and the second fuel economy (FE 1-FE 2) being less than the threshold difference.

The first fuel economy being within the threshold range of the baseline fuel economy indicates that the AAD is operating actively (e.g., the AAD is deployed and air is being deflected to reduce drag on the vehicle). Upon the commanded change in AAD operation to the AAD-retracted mode, the second fuel economy measured would be expected to change if the AAD system were not degraded. If the first fuel economy (measured with the AAD deployed) and the second fuel economy (measured with the AAD retracted) are similar, e.g., the difference between the first fuel economy and the second fuel economy (FE 1-FE 2) is less than the threshold difference, then the AAD mechanism is determined to be stuck (e.g., degraded). Because the first fuel economy FE 1 is determined to be within the threshold range of the baseline fuel economy, the AAD system is confirmed as being stuck in the AAD-deployed mode with AAD shutter continuing to be lowered, even when commanded to be retracted.

At 424, method 400 includes notifying an operator of the vehicle of the degraded AAD system and/or setting a diagnostic code indicative of the degraded AAD function. An indication of degradation may include an indication of degradation of the AAD shutter, or the associated linkage involved in moving the shutter between its stowed and deployed positions. For example, an operator may be notified by illuminating an indicator on the vehicle instrument panel alerting the vehicle operator of the received notification. In still further examples, because the AAD is determined to be stuck in the deployed mode, the controller may raise active vehicle suspensions at a lower vehicle speed and limit off-road vehicle driving until the AAD mechanisms are determined not be degraded (e.g., after a service event). Method 400 then returns.

Returning to 420, if the first fuel economy FE 1 is not determined to be within a threshold range of the baseline fuel economy (e.g., NO at 420), method 400 proceeds to 426 to indicate the AAD system is stuck in the retracted mode (e.g., where the AAD shutter is retracted and stowed even when the AAD is commanded to be deployed). The AAD mechanism may be indicated as stuck in the retracted mode (e.g., degraded) based on the first fuel economy FE 1 not being within a threshold range of the baseline fuel economy and further based on the difference between the first fuel economy and the second fuel economy (FE 1-FE 2) being less than the threshold difference.

For example, the first fuel economy being outside the threshold range of the baseline fuel economy (not within 3%-5% as an example) at vehicle high speed and steady-state conditions indicates the AAD mechanisms are not addressing the aerodynamic drag and hence reducing fuel economy relative to non-degraded AAD mechanisms. Further, upon the commanded change to the retracted state, the second fuel economy measured would be anticipated to change if the AAD system were functional. If the first fuel economy and the second fuel economy are determined to be similar, e.g., the difference between the first fuel economy and the second fuel economy (FE 1-FE 2) is less than the threshold difference, then the AAD is determined as stuck (e.g. degraded). Because the first fuel economy FE 1 is not within a threshold range of the baseline fuel economy, the AAD system is confirmed as being stuck in the retracted mode.

Upon diagnosing the AAD system as being stuck in the retracted mode, method 400 may proceed to 424 to notify an operator of the vehicle of the AAD system being degraded and/or set a diagnostic code indicative of the AAD function being degraded. An indication of degradation may indicate degradation of the shutter or associated linkage for lowering and raising the AAD shutter. For example, an operator may be notified by illuminating an indicator on the vehicle instrument panel alerting the vehicle operator of the received notification. In some examples, upon determining that the AAD shutter is unable to be deployed, the controller may not limit vehicle speeds, but may adjust vehicle navigation (such as via a trip planning software) to select a different route of travel that is based on the fuel economy penalty associated with the highway driving with a degraded AAD mechanism. Also at higher vehicle speeds, the fuel economy gain is lost with a degraded AAD. The mitigating action may be continued until the AAD mechanisms are determined not to be degraded (e.g., after a service event). Method 400 then returns.

It will be appreciated that is the AAD is degraded, including stuck in the retracted or deployed position, the vehicle controller may reset an average fuel economy metric to estimate a new fuel economy average that is more accurately reflective of the degraded AAD state.

In this way, a commanded change in AAD operation may result in a measurable change in the fuel usage by the vehicle, impacting fuel economy. Based on a comparison of the second fuel economy measured after AAD retraction relative to baseline fuel economy and/or a first fuel economy measured while AAD is deployed, a diagnosis of degradation of the AAD function may be indicated. While FIG. 3 is shown as initiating the diagnostic routine while in the AAD deployed mode, retracting the AAD, and comparing the resultant change in fuel economy to a threshold change, the operations may be carried out in a different order without departing from the scope of the disclosure. For example, the routine may commence when the engine is operating with the AAD retracted, then deployed, and then compare the resultant change in fuel economy to a threshold change. In such an example, the fuel economy may be expected to increase upon operation in the AAD deployed mode.

AAD degradation may be indicated responsive to a difference between the first fuel economy and the second fuel economy being less than a first threshold difference and the first fuel economy being within a second threshold range of the baseline fuel economy. In this way, AAD mechanisms may be indicated as stuck in the deployed mode.

AAD degradation may also be indicated responsive to a difference between the first fuel economy and the second fuel economy being less than a first threshold difference and the first fuel economy being outside of a second threshold range of the baseline fuel economy. In this way, AAD mechanisms may be indicated as stuck in the retracted mode.

In some examples, rather than measuring fuel economy before and after the commanded change in AAD mode in order to determine if the AAD hardware is degraded, method 300 may additionally or alternatively utilize other mechanisms for measuring fuel usage, such as an absolute volume of fuel consumed, a duty cycle of the fuel injectors of the engine, or other fuel usage metric.

It will be further appreciated that the fuel economy based diagnostic routine may be used to complement or supplement the output of a position sensor or speed sensor based AAD diagnostic routine. For example, if the output of both a sensor based AAD diagnostic routine and the fuel economy based diagnostic routine indicates AAD degradation, then AAD degradation can be confirmed with a higher reliability. As another example, the fuel economy based routine may be used to diagnose the AAD mechanism when sensor degradation is known or confirmed. Further still, a discrepancy between the results of the fuel economy based diagnostic routine and the sensor output based routine may be used to identify potential sensor error. In such a case, a distinct sensor diagnostic routine may be triggered. For example, if the fuel economy diagnostic indicates a stuck AAD mechanism and the sensors agree, then the diagnostic result is determined to be more robust. However, if the fuel economy metric indicates that the AAD is not degraded but the sensors indicate otherwise, then the controller may infer that the sensors are irrational.

FIG. 5 shows a timing diagram 500 of operating parameters that may be observed during the execution of method 400. The first plot from the top of diagram 500 illustrates fuel economy as a function of time (shown by curves 502 and 504). Fuel economy increases from a relatively low fuel economy (e.g., 30 MPG) to a relatively high fuel economy (e.g., 35 MPG) along the vertical axis (y-axis). The second plot from the top illustrates vehicle speed as a function of time (shown by curve 506). Vehicle speed increases from a speed of zero to a relatively high speed (e.g., 60 MPH) along the vertical axis. The third plot from the top illustrates AAD mode as a function of time, shown by curve 508, where the VDE mode is either in a deployed mode or a retracted mode. The fourth plot from the top illustrates engine load as a function of time (shown by curve 512). Engine load increases from a load of zero to a maximum rated load along the vertical axis. Each of the illustrated plots are time aligned.

At time t1, the vehicle speed is relatively high, such as at 60 MPH, and the engine load is relatively low (e.g., less than 25% of maximum rated load). Due to the higher vehicle speed, the vehicle is operating in the AAD deployed mode with the AAD shutter lowered so that ram air is deflected over and under the vehicle. As a result of the resulting improvement in aerodynamic flow, fuel economy is relatively high (as shown by both curves 502 and 504, which overlap between times t1 and t2). Between time t1 and time t2, fuel economy may be measured and stored in the controller (e.g., as an average fuel economy, FE 1).

At time t2, the vehicle is actively switched to the retracted mode and the AAD shutter is raised and stowed. The AAD mechanism is actively retracted even though the vehicle speed is high enough to require the AAD to be lowered and deployed. Following actuation of the AAD to the retracted mode, fuel economy is again measured (e.g., during time t2 to t3) and stored in the controller (e.g., as an average fuel economy FE 2). The FE 2 is compared to FE 1 to determine if the AAD mechanisms are degraded. As explained previously, fuel economy is expected to decrease upon the commanded switch to the retracted mode, as the stowed shutter causes lift and aerodynamic drag to be experienced on the vehicle, which negatively affects fuel economy. Thus, as shown by curve 404, the fuel economy drops to a relatively low fuel economy if the AAD actuators (e.g., the shutter or the associated linkages) are not degraded. However, if the AAD actuators are degraded, the fuel economy does not change upon switching from the deployed mode to the retracted mode, as shown by curve 502.

Furthermore, the baseline fuel economy is shown as line 503. As appreciated by FIG. 5, the fuel economy from time t1 to time t2 (FE 1) is substantially similar to the baseline fuel economy (e.g., within a threshold of the baseline, such as within 3-5% of the baseline). The fuel economy from time t2 to time t3 (FE 2) is also substantially similar to the baseline (for the vehicle exhibiting degraded AAD mechanisms). As such, the AAD mechanisms are determined to be stuck in the deployed mode, as the AAD mechanisms are able to operate as intended during AAD deployed mode (e.g., with the AAD shutter lowered) but are not able to be actuated during the AAD-retracted mode. At time t3, the diagnostic routine ends and the engine again operates in the AAD deployed mode, causing the fuel economy to increase (if the AAD mechanisms are not degraded).

FIG. 6 shows another timing diagram 600 of operating parameters that may be observed during the execution of method 400. The first plot from the top of diagram 600 illustrates fuel economy as a function of time (shown by curves 602 and 604). Fuel economy increases from a relatively low fuel economy (e.g., 30 MPG) to a relatively high fuel economy (e.g., 35 MPG) along the vertical axis (y-axis). The second plot from the top illustrates vehicle speed as a function of time (shown by curve 606). Vehicle speed increases from a speed of zero to a relatively high speed (e.g., 50 or 60 MPH) along the vertical axis. The third plot from the top illustrates cylinder status as a function of time, shown by curve 608, where the cylinder status is either AAD deployed mode or AAD retracted mode. The fourth plot from the top illustrates engine load as a function of time (shown by curve 612). Engine load increases from a load of zero to a maximum rated load along the vertical axis. Each of the illustrated plots are time aligned.

At time t1, the vehicle speed is relatively high, such as at 60 MPH, and the engine load is relatively low (e.g., less than 25% of maximum rated load). Due to the higher vehicle speed, the vehicle is operating in the AAD deployed mode. As a result, for an engine operating with non-degraded AAD mechanisms (shown by curve 602), fuel economy is relatively high between times t1 and t2. Between time t1 and time t2, fuel economy may be measured and stored in the controller (e.g., as an average fuel economy, FE 1). In contrast, for an engine operating with degraded AAD mechanisms (shown by curve 604), the fuel economy may be relatively low, as the AAD mechanisms are not operating as intended and the associated increase in aerodynamic drag results in a fuel economy penalty.

At time t2, the vehicle is switched to the AAD retracted mode wherein the shutter is retracted to a stowed position. Following retraction of the AAD shutter, fuel economy is again measured (e.g., during time t2 to t3) and stored in the controller (e.g., as an average fuel economy FE 2). The FE 2 is compared to FE 1 to determine if the AAD mechanism is degraded. As explained previously, fuel economy is expected to decrease upon the commanded switch to the AAD retracted mode, as the increase in aerodynamic drag associated with the stowing of the AAD shutter negatively affects fuel economy. Thus, as shown by curve 602, the fuel economy drops to a relatively low fuel economy if the AAD actuators (e.g., the AAD shutter or the associated linkages) are not degraded. However, if the AAD actuators are degraded, the fuel economy does not change upon switching from the AAD deployed mode to the retracted mode, as shown by curve 504.

Furthermore, the baseline fuel economy is shown as line 603. As appreciated by FIG. 6, the fuel economy from time t1 to time t2 (FE 1) is different than the baseline fuel economy (e.g., outside of a threshold of the baseline, such as outside of 3-5% of the baseline). The fuel economy from time t2 to time t3 (FE 2) is also different than the baseline (for the vehicle exhibiting degraded AAD mechanisms). As such, the AAD mechanisms are determined to be stuck in the retracted mode, as the AAD mechanisms are unable to operate as intended during AAD deployed mode but are able to be actuated during the retracted mode. At time t3, the diagnostic routine ends and the engine again operates in the AAD deployed mode, causing the fuel economy to increase (if the AAD mechanisms are not degraded).

In this way, a fuel economy based diagnostic routine is able to ensure a more robust identification of degraded AAD mechanisms. As such, the change in fuel economy based routine may be used to complement the output of a position sensor or speed sensor based routine, or supplement the routine in the case of known sensor degradation. Further, a discrepancy between the results of the fuel economy based routine and the sensor output based routine may be used to identify potential sensor error. For example, sensors mounted to a vehicle underbody may be prone to contamination from dirt, salt, mud, freezing water, etc. The technical effect of diagnosing AAD mechanisms based on a change in fuel economy is a low-cost, robust method for detecting if AAD mechanisms are operating as intended. Further, signal errors arising from AAD hardware issues may be better differentiated from those arising from sensor issues. Furthermore, the reliance on costly position or speed sensors is reduced. Even if sensors are already present and being used for AAD diagnostics, by complementing the sensor based diagnostic with a fuel economy based metric, the accuracy and reliability of AAD diagnostic results is improved.

In one example, a method comprises: during steady-state vehicle cruising, commanding a transition of an aerodynamic mechanism, coupled to a body of the vehicle, between a deployed and a retracted position; and indicating degradation of the mechanism responsive to fuel usage change of an engine of the vehicle following the commanding. In the preceding example, additionally or optionally, the aerodynamic mechanism is an active air dam shutter and wherein commanding the aerodynamic mechanism to the deployed position includes lowering the shutter below a vehicle bumper via a linkage coupled to the shutter. In any or all of the preceding examples, additionally or optionally, the aerodynamic mechanism is commanded to the more deployed position responsive to vehicle speed higher than a threshold speed, and commanded to the more retracted position responsive vehicle speed lower than the threshold speed. In any or all of the preceding examples, additionally or optionally, the threshold vehicle speed is adjusted as a function of one or more or each of a plurality of vehicle operating parameters including barometric pressure, wind direction, wind speed, and ram air density. In any or all of the preceding examples, additionally or optionally, commanding the aerodynamic mechanism to the retracted position includes raising the shutter and stowing the shutter behind the vehicle bumper via the linkage. In any or all of the preceding examples, additionally or optionally, indicating degradation of the mechanism includes indicating degradation of the shutter or the linkage coupled to the shutter. In any or all of the preceding examples, additionally or optionally, the fuel usage change comprises a change in a level of average fuel economy. In any or all of the preceding examples, additionally or optionally, the method further comprises determining a first fuel economy with the aerodynamic structure commanded to the deployed position and determining a second fuel economy with the aerodynamic structure commanded to the retracted position. In any or all of the preceding examples, additionally or optionally, indicating degradation based on the change in fuel economy comprises indicating that the mechanism is stuck in the deployed position based on a difference between the first fuel economy and the second fuel economy being less than a first threshold difference and the first fuel economy being within a second threshold range of a baseline fuel economy. In any or all of the preceding examples, additionally or optionally, the method further comprises, responsive to the indication that the mechanism is stuck in the deployed position, limiting vehicle operation on unpaved roads. In any or all of the preceding examples, additionally or optionally, indicating degradation based on the change in fuel economy further comprises indicating that the mechanism is stuck in the retracted position based on the difference between the first fuel economy and the second fuel economy being less than the first threshold difference and the first fuel economy being outside of the second threshold range of the baseline fuel economy. In any or all of the preceding examples, additionally or optionally, the method further comprises, responsive to the indication that the mechanism is stuck in the retracted position, adjusting a route of travel of the vehicle to increase a bias for fuel economy. In any or all of the preceding examples, additionally or optionally, the method further comprises, based on the indication of mechanism degradation, notifying an operator and/or setting a diagnostic code. In any or all of the preceding examples, additionally or optionally, the aerodynamic mechanism is one of a moonroof, a truck side skirt, and a passive air dam.

Another example vehicle system comprises: an engine; an active air dam (AAD) coupled to a vehicle bumper via a linkage; and a controller storing instructions in non-transitory memory executable to: command the linkage to actuate the air dam between a deployed position where the air dam is lowered below the bumper, and a retracted position where the air dam is raised for stowage behind the bumper; and indicate degradation of the AAD responsive to a change in average fuel economy following the command being less than a threshold change. In the preceding example, additionally or optionally, the instructions are executable to indicate that the degradation of the AAD includes the AAD being stuck in the deployed position based on the average fuel economy following the command being substantially equal to a baseline fuel economy. In any or all of the preceding examples, additionally or optionally, the instructions are executable to indicate that the degradation of the AAD includes the AAD being stuck in the retracted position based on the average fuel economy following the command being less than the baseline fuel economy. In any or all of the preceding examples, additionally or optionally, the commanding and indicating occur on a current drive cycle of the vehicle, and wherein the instructions are executable to, during a prior vehicle drive cycle, command the linkage to lower the AAD to the deployed position during steady-state vehicle cruising conditions and determine the baseline fuel economy based on fuel usage over time on the prior vehicle drive cycle. In any or all of the preceding examples, additionally or optionally, the instructions are executable to: responsive to the indication of the AAD being stuck in the deployed position, setting a first diagnostic code and raising a vehicle active suspension system at a lower than default vehicle speed while limiting off-road vehicle travel; and responsive to the indication of the AAD being stuck in the retracted position, setting a second, different diagnostic code and adjusting a route of travel of the vehicle to increase a navigational bias for fuel economy. In any or all of the preceding examples, additionally or optionally, the system further comprises a position sensor coupled to the AAD, wherein the instructions are executable to differentiate between AAD degradation and position sensor degradation responsive to a change in position sensor output following the command relative to the change in average fuel economy following the command.

Another example method comprises: commanding an air dam coupled to a vehicle body to a first position responsive to vehicle speed higher than a threshold speed, and to a second position responsive vehicle speed lower than the threshold speed, wherein the threshold vehicle speed is adjusted as a function of each of a plurality of vehicle operating parameters including barometric pressure, wind direction, wind speed, and ram air density. In the preceding example, the first position is a more deployed position and the second position is a more retracted position. In any or all of the preceding examples, additionally or optionally, the method further comprises diagnosing the AAD mechanism during steady-state vehicle cruising responsive to fuel usage change of an engine of the vehicle following a transition of the AAD mechanism between the first position and the second position. In any or all of the preceding examples, additionally or optionally, the threshold vehicle speed is lowered relative to a default threshold speed as a wind speed in an aft-to-for direction of vehicle motion increases, and wherein the threshold vehicle speed is raised relative to the default threshold speed as barometric pressure decreases or altitude increases.

In another representation, an example method comprises: during steady-state vehicle cruising, establishing a baseline fuel economy with an air dam deployed; actively retracting the air dam; and indicating degradation of a hardware associated with the air dam responsive to a less than threshold decrease in fuel economy from the baseline fuel economy following the retracting. In the preceding example, additionally or optionally, indicating degradation of the hardware includes indicating degradation of one of a shutter of the air dam and a linkage actuating the shutter.

In another representation, a method for a vehicle includes indicating degradation of an active air dam mechanism during vehicle steady-state operation based on a fuel usage change of a vehicle engine, upon a commanded change in active air dam mechanism position. The fuel usage change may include a change in average fuel economy. In one example, the commanded change in active air dam position may include a commanded transition from a retracted position where a shutter of the active air dam is stowed behind a vehicle bumper, to a deployed position where the shutter is lowered, via a linkage, below the vehicle bumper, and the fuel usage change may include an increase in fuel usage following the lowering of the shutter. In another example, the commanded change may include a commanded transition from the deployed position to the stowed position, and the fuel usage change may include a decrease in fuel usage following the transition.

In yet another representation, a method for a vehicle includes: adjusting a threshold vehicle speed for actuating an active air dam coupled to a vehicle body as a function of a plurality of vehicle operating parameters including barometric pressure, altitude, wind direction, wind speed, and ram air density; and actuating the active air dam based on vehicle speed relative to the adjusted threshold speed. In the preceding example, additionally or optionally, the active air dam is actutaed to a more deployed position when vehicle speed exceeds the threshold speed, and actuated to a more retracted position when vehicle speed is below the threshold speed. In any or all of the preceding examples, additionally or optionally, the threshold vehicle speed is lowered as a wind speed in an aft-to-for direction of vehicle motion increases, and wherein the threshold vehicle speed is raised as barometric pressure decreases or altitude increases.

In yet another representation, during a first condition, an air dam coupled to a vehicle body is commanded to a first, more deployed position responsive to vehicle speed higher than a first threshold speed, and to a second, more retracted position responsive to vehicle speed lower than the first threshold speed. Further, during a second condition, while operating the vehicle at a higher altitude than the first condition, the air dam is commanded to the first, more deployed position responsive to vehicle speed higher than a second threshold speed, and to the second, more retratced position responsive to vehicle speed lower than the second threshold speed, the second threshold speed raised relative to the first threshold speed as vehicle altitude increases. In the preceding example, additionally or optionally, during a third condition, while operating the vehicle with a higher tail wind than the first condition, the air dam is commanded to the first, more deployed position responsive to vehicle speed higher than a third threshold speed, and to the second, more retracted position responsive to vehicle speed lower than the third threshold speed, the third threshold speed lowered relative to the first threshold speed as tail wind speed increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during steady-state vehicle cruising,
      commanding a transition of an aerodynamic mechanism, coupled to a body of a vehicle, between a more deployed position and a more retracted position; and
      indicating degradation of the aerodynamic mechanism responsive to a fuel usage change of an engine of the vehicle following the commanding, wherein the aerodynamic mechanism is an active air dam shutter and wherein commanding the aerodynamic mechanism to the more deployed position includes lowering the shutter below a vehicle bumper via a linkage coupled to the shutter, and commanding the aerodynamic mechanism to the more retracted position includes raising the shutter and stowing the shutter behind the vehicle bumper via the linkage.

2. The method of claim 1, wherein the aerodynamic mechanism is commanded to the more deployed position responsive to vehicle speed higher than a threshold speed, and commanded to the more retracted position responsive to vehicle speed lower than the threshold speed.

3. The method of claim 2, wherein the threshold speed is adjusted as a function of one or more or each of a plurality of vehicle operating parameters including barometric pressure, wind direction, wind speed, and ram air density.

4. The method of claim 1, wherein indicating degradation of the aerodynamic mechanism includes indicating degradation of the shutter or the linkage coupled to the shutter.

5. The method of claim 4, wherein the fuel usage change comprises a change in a level of average fuel economy.

6. The method of claim 5, further comprising determining a first fuel economy with the aerodynamic mechanism commanded to the more deployed position and determining a second fuel economy with the aerodynamic mechanism commanded to the more retracted position.

7. The method of claim 6, wherein indicating degradation based on the change in fuel economy comprises indicating that the aerodynamic mechanism is stuck in the more deployed position based on a difference between the first fuel economy and the second fuel economy being less than a first threshold difference and the first fuel economy being within a second threshold range of a baseline fuel economy.

8. The method of claim 7, wherein the indicating degradation based on the change in fuel economy further comprises indicating that the aerodynamic mechanism is stuck in the more retracted position based on the difference between the first fuel economy and the second fuel economy being less than the first threshold difference and the first fuel economy being outside of the second threshold range of the baseline fuel economy.

9. The method of claim 8, further comprising, responsive to the indication that the aerodynamic mechanism is stuck in the more retracted position, adjusting a route of travel of the vehicle to increase a bias for fuel economy, and, responsive to the indication that the aerodynamic mechanism is stuck in the more deployed position, limiting vehicle operation on unpaved roads.

10. The method of claim 1, further comprising, based on the indication of degradation of the aerodynamic mechanism, notifying an operator and/or setting a diagnostic code.

11. A vehicle system, comprising:
an engine;
an active air dam (AAD) coupled to a vehicle bumper via a linkage; and
a controller storing instructions in non-transitory memory executable to:
command the linkage to actuate the AAD between a more deployed position where the AAD is lowered below the bumper and a more retracted position where the AAD is raised for stowage behind the bumper; and
indicate degradation of the AAD responsive to a change in average fuel economy following the command being less than a threshold change.

12. The system of claim 11, wherein the instructions are executable to indicate that the degradation of the AAD includes the AAD being stuck in the more deployed position based on the average fuel economy following the command being substantially equal to a baseline fuel economy.

13. The system of claim 12, wherein the instructions are executable to indicate that the degradation of the AAD includes the AAD being stuck in the more retracted position based on the average fuel economy following the command being less than the baseline fuel economy.

14. The system of claim 13, wherein the commanding and indicating occur on a current drive cycle of a vehicle, and wherein the instructions are executable to, during a prior vehicle drive cycle, command the linkage to lower the AAD to the more deployed position during steady-state vehicle cruising conditions and determine the baseline fuel economy based on fuel usage over time in the prior vehicle drive cycle.

15. The system of claim 13, wherein the instructions are executable to:
responsive to the indication of the AAD being stuck in the more deployed position, setting a first diagnostic code and raising a vehicle active suspension system at a lower than default vehicle speed while limiting off-road vehicle travel; and
responsive to the indication of the AAD being stuck in the more retracted position, setting a second, different diagnostic code and adjusting a route of travel of a vehicle to increase a navigational bias for fuel economy.

16. The system of claim 11, further comprising a position sensor coupled to the AAD, wherein the instructions are executable to differentiate between AAD degradation and position sensor degradation responsive to a change in position sensor output following the command relative to the change in average fuel economy following the command.

17. A method, comprising:
commanding an air dam coupled to a vehicle body to a first position responsive to vehicle speed higher than a threshold speed and to a second position responsive to vehicle speed lower than the threshold speed, wherein the threshold speed is adjusted as a function of each of a plurality of vehicle operating parameters including barometric pressure, wind direction, wind speed, and ram air density.

18. The method of claim 17, wherein the first position is a more deployed position and the second position is a more retracted position, the method further comprising diagnosing the air dam during steady-state vehicle cruising conditions responsive to a fuel usage change of an engine of a vehicle following a transition of the air dam between the first position and the second position.

19. The method of claim 17, wherein the threshold speed is lowered relative to a default threshold speed as a wind speed in an aft-to-for direction of vehicle motion increases, and wherein the threshold speed is raised relative to the default threshold speed as barometric pressure decreases or altitude increases.

* * * * *